United States Patent [19]
Andrews et al.

[11] Patent Number: 6,061,428
[45] Date of Patent: May 9, 2000

[54] CUSTOMER BRIDGE WITH INDICATORS FOR DIAGNOSING ELECTRICAL CONNECTION PROBLEMS

[75] Inventors: Scott R. Andrews, Marietta, Ga.;
Bassel Hage Daoud, Parsippany, N.J.;
Claude R. Narcisse, Montclair, N.J.;
Lawrence Marc Paul, Randolph, N.J.

[73] Assignee: Lucent Technologies Inc., Murray Hill, N.J.

[21] Appl. No.: 09/090,730

[22] Filed: Jun. 4, 1998

[51] Int. Cl.[7] ........................................................ H04B 1/24
[52] U.S. Cl. ............................. 379/27; 379/21; 340/545
[58] Field of Search ................................. 379/2, 21, 27, 379/29, 23, 26; 340/545; 339/97

[56] References Cited

U.S. PATENT DOCUMENTS

| | | | |
|---|---|---|---|
| 4,585,290 | 4/1986 | Knickerbocker et al. | 339/97 |
| 4,588,862 | 5/1986 | Grabowy | 379/27 |
| 4,736,403 | 4/1988 | McAlevey et al. | 379/26 |
| 4,756,017 | 7/1988 | Bush | 379/23 |
| 5,828,303 | 10/1998 | Williams | 340/545 |

*Primary Examiner*—Paul Loomis
*Attorney, Agent, or Firm*—Gibbons, Del Deo, Dolan, Griffinger & Vecchione

[57] ABSTRACT

The present invention teaches a bridging device for telephone communications which may be connected at customer premise locations in order to provide diagnostic information with respect to the line conditions of network side and customer side wiring. Visual indicators are electrically configured such that they may be selectively included in the circuit path between the network side and customer side wiring. The status of the visual indicators when the device of the present invention is placed in a test mode provides diagnostic information about the customer side and network side wiring, such as "short", "open" or "general trouble" indications. In one exemplary embodiment of the present invention two LEDs are used in combination within the bridging device. A first LED is attached in series with the wiring loop coupled to customer telephone equipment. A second LED is attached to a switch that shorts the wiring loop before the interface to the network wiring. Based on the status of the two LEDs when the device is placed in test mode, a diagnosis can be made whether there is a short or open in the customer side wiring or a general trouble on the network side wiring.

16 Claims, 2 Drawing Sheets

CUSTOMER BRIDGE WITH INDICATORS FOR DIAGNOSING ELECTRICAL CONNECTION PROBLEMS

FIELD OF THE INVENTION

The present invention relates generally to connection devices for telephone communications systems and more particularly bridging devices for such systems typically located at customer premises.

BACKGROUND OF THE INVENTION

Building entrance protector (BEP) is the name used in the art of telephone equipment to describe the junction box where telephone lines from outside plant (OSP) wiring are joined to customer premises equipment. In the most common application, the BEP is the place where the telephone lines from a telephone pole, for example, enter a building and are joined to the telephone system within that building. Within the BEP there is an input wire termination device that receives the telephone lines contained within the outside plant wiring. Also contained within the BEP is an output wire termination device that receives the telephone lines required for the customer premises equipment. The telephone lines required for the customer premises are typically referred to as inside plant (ISP) wiring.

The distinction between OSP wiring and ISP wiring is an important one, since the responsibility for maintaining the integrity of each type of wiring typically rests with different parties. For instance, the responsibility for maintaining OSP wiring generally rests with the telephone service provider, while the responsibility for maintaining ISP wiring is generally that of the customer, unless the customer has contracted with the service provider for another type of maintenance arrangement.

Because the responsibility for remedying a problem with a customer's communication system may shift depending on the source of the problem, i.e., OSP or ISP wiring, it is imperative that the source of the problem first be determined before taking corrective action. A prior art solution for determining whether a telephone or communication system problem exists in either the OSP or ISP wiring is to provide a specific type of bridging device at the customer's premises at or near the BEP, where the transition from OSP to ISP wiring is made so that a person attempting to service a problem may tap into the phone lines to assist in determining the source of the problem. One example of a bridging device includes an RJ-11 jack that accepts a corresponding RJ-11 plug of the type typically utilized with telephone line cords. An RJ-11 plug that is inserted into the bridging device (and a telephone device connected thereto) will be coupled directly to the corresponding OSP wiring, bypassing the ISP wiring.

One scenario for use of the described bridging device is as follows. If a telephone subscriber living in an apartment building with many individual subscribers experiences a telephone problem at a location equipped with such bridging devices, the subscriber may be instructed to plug his or her telephone into the corresponding jack of the bridging device located at or near the BEP in, for example, a utility room. If the telephone operates when plugged into the bridging device (when coupled directly to the OSP wiring) then by process of elimination, the problem would typically be located within the ISP wiring and be the responsibility of the customer. If, on the other hand, this is not the case, and the communications channel still does not operate while being directly coupled to the OSP wiring then it can be deduced that the OSP wiring is at fault.

Utilizing these prior art customer bridging devices, a customer or a telephone company service person can in general narrow the source of a communications problem to OSP or ISP wiring. One significant problem with the above test procedures (and the use of such prior art customer bridging devices), however, is that an assumption is made regarding the condition of the telephone instrument itself, i.e., that it is in working order. It is illogical, however, to have the customer utilize his or her own telephone in order to sectionalize the problem, since if in fact the customer telephone is not in proper working order, an incorrect problem diagnosis will be made that the OSP wiring is at fault, in that normal calling procedures cannot be followed. In addition, these prior art devices do not offer any assistance in diagnosing the specific type of problem, e.g., "short" or "open", once the location of the problem in general has been determined. Accordingly, there is a need for a low cost bridging device for installation at customer premises, which eliminates inconsistencies in prior art testing techniques and which also includes diagnostic capabilities for determining the type of problem located.

SUMMARY OF THE INVENTION

The present invention teaches a bridging device for telephone communications which may be connected at customer premise locations in order to provide diagnostic information with respect to the line conditions of network side and customer side wiring. Visual indicators are electrically configured such that they may be selectively included in the circuit path between the network side and customer side wiring. The status of the visual indicators when the device of the present invention is placed in a test mode provides diagnostic information about the customer side and network side wiring, such as "short", "open" or "general trouble" indications.

In one exemplary embodiment of the present invention two LEDs are used in combination within the bridging device. A first LED is attached in series with the wiring loop coupled to customer telephone equipment. A second LED is attached to a switch that shorts the wiring loop before the interface to the network wiring. Based on the status of the two LEDs when the device is placed in test mode, a diagnosis can be made whether there is a short or open in the customer side wiring or a general trouble on the network side wiring.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION

Figure 1:
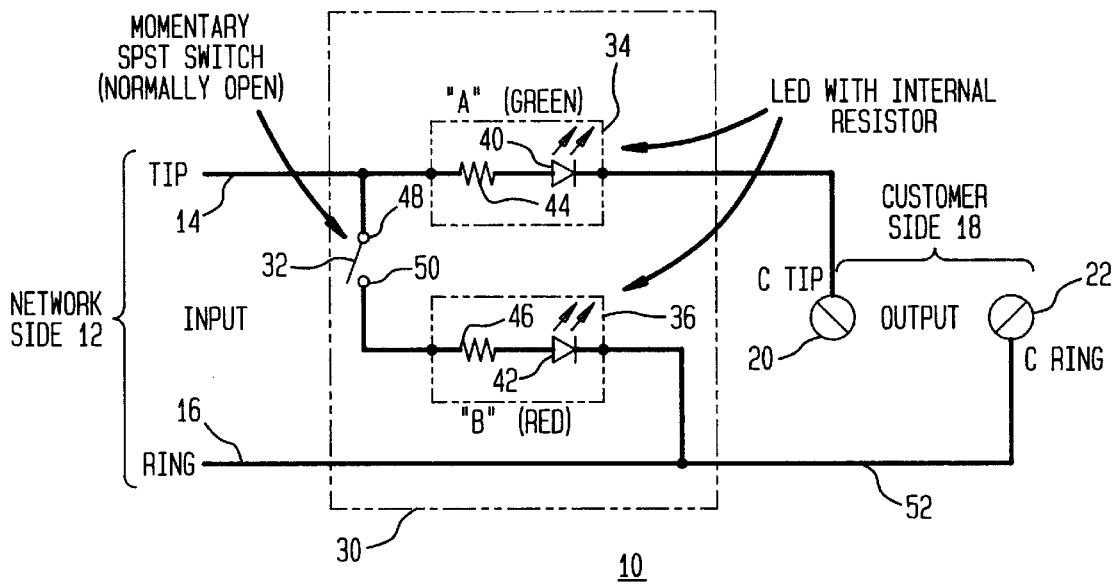
FIG. 1 shows a circuit diagram for one exemplary embodiment of a bridging device according to the present invention.

Referring to FIG. 1, there is shown a circuit diagram for one exemplary embodiment of a customer bridging device 10 in accordance with the present invention. The customer bridging device 10 includes a set of input terminals 12 having tip and ring inputs 14, 16 for connection to a communications service provider network, for example, outside plant (OSP) wiring of the public switched telephone network (PSTN). Also included in the bridging device is a set of output terminals 18 having tip and ring outputs 20, 22 at which connections to customer communications equipment, i.e., inside plant (ISP) wiring can be made.

Diagnostic circuitry 30 is coupled between the input terminals 12 and the output terminals 18. As shown in FIG. 1, the diagnostic circuitry is comprised of switch 32 and first and second visual indicators 34, 36. In one exemplary embodiment of the customer bridging device, the switch 32 is a normally open single pole single throw (SPST) momentary switch and the visual indicators 34, 36 are LEDs 40, 42 having corresponding internal current limiting resistors 44, 46 coupled in series, although the current limiting resistors need not be internal to the LEDs. Also, although the visual indicators are shown as LEDs, it would be understood that other low current light emitting or visual indicating devices may also be used. Preferably, the first and second visual indicators will produce distinct visual indications such as different color indications, however, such a feature is not necessary to the operation of the present invention.

As shown, the first visual indicator 34 is coupled in series between the input tip terminal 14 and the output tip terminal 20. The anode or positive side of the first visual indicator 34 is coupled to the network side terminals 12 as is a first terminal 48 of the switch 32. A second terminal 50 of the switch 32 is coupled to the anode of the second visual indicator 36. The cathode or negative side of the second visual indicator 36, as shown, is coupled to the "ring" conductive line 52 between the input ring terminal 16 and the output ring terminal 22.

Figure 2:
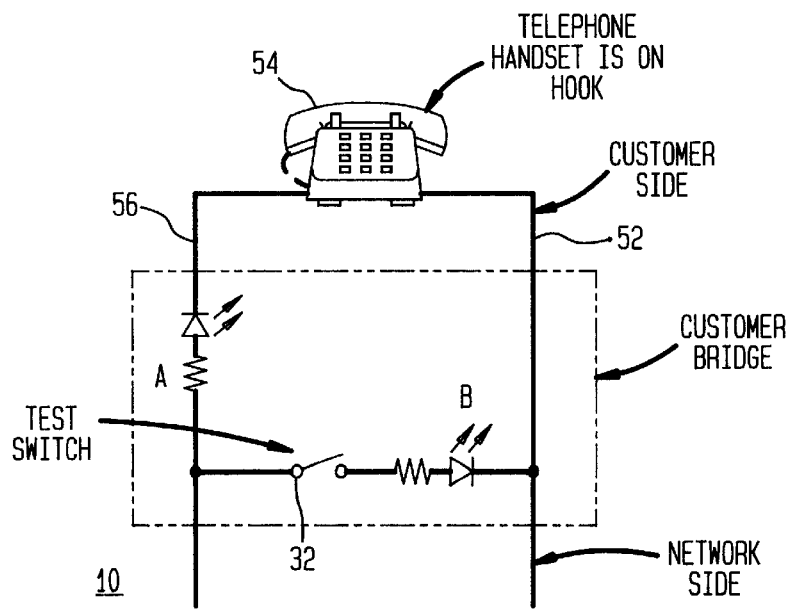
FIG. 2 shows a simplified schematic drawing of the present invention as utilized in an exemplary customer application.

FIG. 2 shows a simplified circuit diagram of the present invention customer bridging device 10 as used with a customer telephone device 54. Referring to Table 1 in combination with FIG. 2, the operation of the customer bridging device 10 of the present invention will now be described. As would be understood, the present invention would typically be utilized when a customer experiences trouble with his or her communications or telephone system. In most cases this would mean that a dial tone is not present at the customer's telephone and the customer is unable to place calls therefrom. In such a circumstance, where a dial tone is not present and it is desirable to determine whether the source of a problem is related to outside plant (OSP) wiring or inside plant (ISP) wiring, a service technician, customer or other party performing the required testing would first verify that no dial tone is present and then place the telephone handset or like device back on hook. The individual performing the testing would next proceed to the location of the bridging device, e.g., utility room, etc. and determine the corresponding bridging device if more than one of the devices is utilized at a specific location. The individual next momentarily depresses the switch 32 on the bridging device 10 and observes the condition of the visual indicators 34,36.

TABLE 1

IF THE CUSTOMER HAS NO DIAL TONE, WITH THE TELEPHONE ON HOOK, DEPRESS AND HOLD THE TEST SWITCH. THE LED'S INDICATE THE FOLLOWING:

| LED "A" (GREEN) | LED "B" (RED) | PROBLEM DESCRIPTION |
| --- | --- | --- |
| ON | ON | SHORT ON CUSTOMER SIDE |
| OFF | ON | OPEN ON CUSTOMER SIDE |
| OFF | OFF | PROBLEM ON NETWORK SIDE |

When the switch is depressed, a closed circuit path is created between the tip line 56, second visual indicator 36 (labeled LED "B") and ring lines 52 within the customer bridging device. If the OSP wiring (network side) is working properly, current will flow from the network side wiring and light one or more of the visual indicators. If both LED A (the first visual indicator) and LED B are lit, as shown in Table 1, this would be an indication of a short (tip and ring wires touching) on the customer side. This diagnosis can be understood based on the simplified circuit diagram of FIG. 2, since when the telephone handset is in the on-hook position, a high impedance condition is created at the telephone device 54 which would inhibit the passage of current therethrough. Thus, in order for a current path to be created which would light LED A, the tip line 56 would have to be in touch with the ring line 52 somewhere on the customer side which is indicative of a short. If on the other hand LED A is off and LED B is on, then in accordance with Table 1, this would be indicative of an open condition on the customer side. This diagnosis can be understood, since the lighting of LED B indicates that the network side wiring is intact where a current path is completed through the switch and LED B. Since, however, a dial tone was not produced at the telephone 54 during an off hook condition and since LED A is not lit thereby negating the likelihood of a short, then the fact that LED A is not lit (by process of elimination) indicates an open condition on the customer side (ISP) wiring. If none of the LEDs light when the switch is depressed, this indicates that no current flow is present through either of the paths including the LED A and LED B. Such a condition, in accordance with Table 1, indicates a problem on the network side OSP wiring, where the telephone service provider would typically be contacted in order to remedy the problem.

Figure 3:
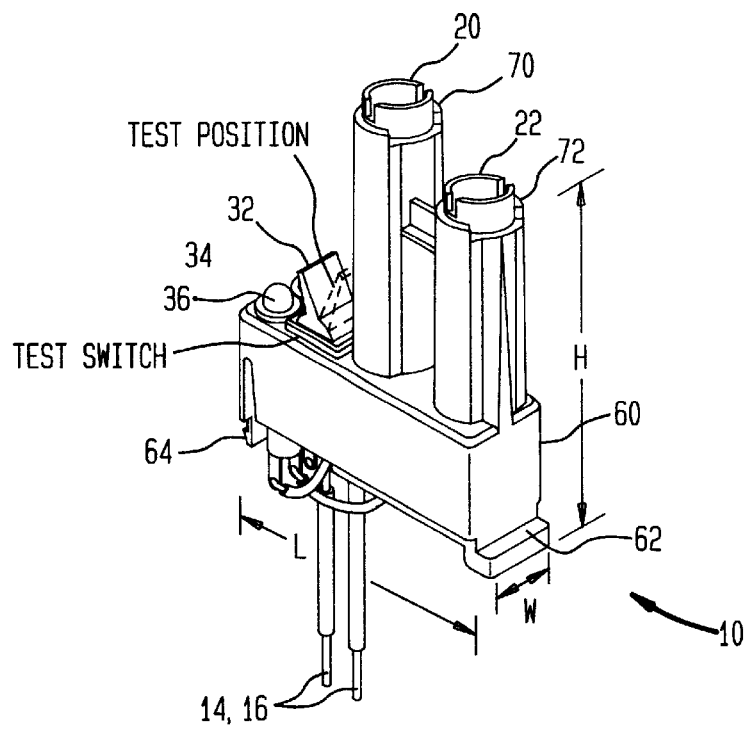
FIG. 3 shows a front perspective view of the physical structure of one exemplary embodiment of the bridging device of present invention.
Figure 4:
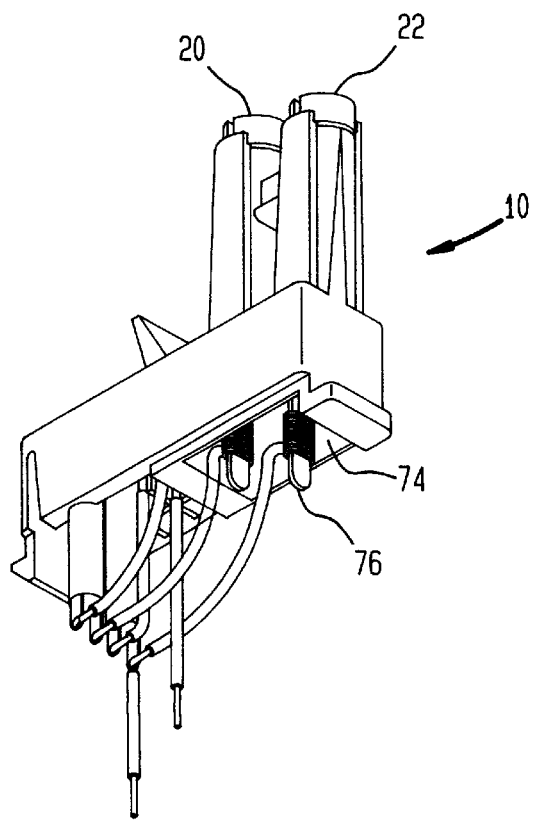
FIG. 4 shows a bottom perspective view of the device shown in FIG. 3.

Referring to FIG. 3, there is shown one exemplary embodiment of the physical structure for the customer bridging device 10 of the present invention. As shown, the device includes an insulated housing 60 which is mountable within a terminal block or a termination panel at a customer premises. A preferable area for locating the bridging devices is a location at or near terminations to customer communications equipment (for ISP wiring), for example, a utility room including a BEP. Mounting is accomplished through a force fit arrangement of a rigid tab 62 and a spring tab 64, where the spring tab 64 may be compressed in order to facilitate installation and removal of the device. The housing 60 has a length L, width W and height H which enable the device to be mounted within standard terminal blocks and/or enclosures, where one set of approximate exemplary dimensions include a length of 1.5 inches, width of 0.5 inches and a height of 1.5 inches. Input terminals 14, 16 represented by lengths of wire protruding from the bottom of the housing which would be easily terminated to the network side of a termination assembly, for example at a BEP. Posts 70, 72 for the output terminals 20, 22 protrude from the top of the housing 60 for tip and ring terminations to the customer communications equipment. As shown the heights of the posts 70, 72 for the two output terminals 20, 22 are different so as to easily distinguish between tip and ring connections. The output terminals 20, 22 can also be color coded, e.g., red and green, as would be understood to a person skilled in the art. FIG. 3 also shows exemplary mounting positions in the housing 60 for both the switch 32 and the visual indicators 34, 36. As shown, the switch 34 and visual indicators 34, 36 are respectively located above the posts for the output terminals so as to facilitate manual and visual access thereto.

Referring to FIG. 3, a bottom perspective view of the device 10 according to the present invention is shown. As can be seen, connections to output terminals 20, 22, visual indicators 34, 36 and switch 32 may be purely mechanical, e.g., wire wrapped, to reduce manufacturing costs. However, solder or other types of connection mechanisms readily apparent to those skilled in the art could also be used. In addition, as shown, the bottom of the housing proximate the output terminals defines a cavity 74 for locating the bottom stems 76 of the output terminals. Space is sufficient within the cavity 74 to allow wire wrapping of the stems 76. The cavity 74 effectively isolates the customer output terminals 20, 22 from the remainder of the mechanism.

From the above, it should be understood that the embodiments described, in regard to the drawings, are merely exemplary and that a person skilled in the art may make variations and modifications to the shown embodiments without departing from the spirit and scope of the invention. All such variations and modifications ale intended to be included within the scope of the invention as defined in the appended claims.

What is claimed is:

1. An apparatus for interfacing a first set of wiring coupled to a telephone network to a second set of wiring coupled to communications equipment, said apparatus being selectively operable to provide diagnostic information with respect to connection integrity of said first and second set of wiring, said apparatus comprising:

a first set of terminals for coupling to said first set of wiring;

a second set of terminals for coupling to said second set of wiring;

at least two visual indicators provided in a predetermined electrical configuration between said first set of terminals and said second set of terminals;

at least one switch being selectively operable for inclusion of said visual indicators in a circuit path between said first set of wiring and said second set of wiring, said visual indicators providing said diagnostic information about said first and second set of wiring;

wherein said diagnostic information displayed by said visual indicators includes indications for a short on said second set of wiring, an open on said second set of wiring and a problem on said first set of wiring.

2. The apparatus of claim 1, wherein said first and second set of wiring each include two corresponding lines, said at least two visual indicators including a first visual indicator coupled in series between corresponding first lines of said first and second set of wiring and a second visual indicator coupled in parallel between corresponding first and second lines of said first and second set of wiring, said second visual indicator being included in said circuit path upon selective operation of said switch.

3. The apparatus of claim 1, wherein said visual indicators are LEDs.

4. The apparatus of claim 1, wherein said switch is a momentary switch.

5. The apparatus of claim 1, wherein said first set of wiring is OSP (outside plant) wiring coupled to a public switched telephone network (PSTN) and said second set of wiring is ISP (inside plant) wiring.

6. The apparatus of claim 1, wherein said switch, said visual indicators and said first and second set of terminals are included within an insulated housing module, said module being insertable in a termination assembly proximate terminations for customer telephone equipment.

7. The apparatus of claim 6, wherein said housing defines a cavity to enable termination for stems of said second set of wiring, said cavity substantially enveloping said stems.

8. A test module bridging device for bridging between OSP (outside plant) wiring and ISP (inside plant) wiring, said OSP wiring coupled to a telephone network and said second set of wiring coupled to customer communications equipment, said device being selectively operable to provide diagnostic information with respect to connection integrity of said OSP and ISP wiring, said device comprising:

a first set of terminals for coupling to said OSP wiring;

a second set of terminals for coupling to said ISP wiring;

one or more visual indicators provided in a predetermined electrical configuration between said first set of terminals and said second set of terminals; and at least one switch being selectively operable to enable said visual indicators to provide said diagnostic information about said OSP and ISP wiring, wherein said diagnostic information displayed by said visual indicators upon operation of said switch includes indications for a short and an open on said ISP wiring and a problem on said OSP wiring.

9. The device of claim 8, wherein said OSP and ISP wiring each include at least two corresponding lines, said visual indicators including a first visual indicator coupled in series between corresponding first lines of said OSP and ISP wiring and a second visual indicator coupled in parallel between corresponding first and second lines of said OSP and ISP wiring, said second visual indicator being included in a circuit path between said first and second lines upon selective operation of said switch.

10. The device of claim 8, wherein said visual indicators are LEDs.

11. The device of claim 8, wherein said first and second lines are tip and ring lines.

12. The device of claim 8, wherein said switch, said visual indicators and said first and second set of terminals are included within an insulated housing module, said module being insertable in a termination assembly proximate terminations for customer telephone equipment.

13. The device of claim 12, wherein said housing defines a cavity to enable termination for stems of said second set of wiring, said cavity allowing sufficient access for wire wrapping of said stems, said cavity substantially enveloping said stems.

14. The device of claim 8 wherein said insulated housing module is insertable in said termination assembly by a force fit arrangement of a rigid tab and a spring tab.

15. A method for diagnosing between telephone wiring connection integrity problems on OSP wiring and ISP wiring, said OSP wiring coupled to a telephone network and said second set of wiring coupled to customer communications equipment, said method including the steps of:

coupling said OSP wiring to a first set of terminals;

coupling said ISP wiring to a second set of terminals;

providing a device having one or more visual indicators coupled in a predetermined electrical configuration between said first set of terminals and said second set of terminals, said device further including at least one switch for selectively including said visual indicators in a circuit path between OSP and ISP wiring; and operating said switch in order to receive said diagnostic information about said OSP and ISP wiring via said visual indicators wherein said diagnostic information displayed by said visual indicators upon operation of said switch includes indications for a short and an open on said ISO wiring and a problem on said OSP wiring.

16. The method of claim 15, wherein said OSP and ISP wiring each include at least two corresponding lines, said visual indicators including a first visual indicator coupled in series between corresponding first lines of said OSP and ISP wiring and a second visual indicator coupled in parallel between corresponding first and second lines of said OSP and ISP wiring, said second visual indicator being included in a circuit path between said first and second lines upon selective operation of said switch.

* * * * *